United States Patent
Miao et al.

(10) Patent No.: US 9,451,568 B2
(45) Date of Patent: Sep. 20, 2016

(54) APPARATUS AND METHOD FOR CHANNEL MEASUREMENT IN RADIO LINK MONITORING IN A WIRELESS NETWORK

(71) Applicant: Samsung Electronics Co., LTD, Suwon-si, Gyeonggi-do (KR)

(72) Inventors: Guowang Miao, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 14/258,829

(22) Filed: Apr. 22, 2014

(65) Prior Publication Data

US 2014/0226650 A1    Aug. 14, 2014

Related U.S. Application Data

(63) Continuation of application No. 13/271,641, filed on Oct. 12, 2011, now Pat. No. 8,755,753.

(60) Provisional application No. 61/477,068, filed on Apr. 19, 2011, provisional application No. 61/408,457, filed on Oct. 29, 2010.

(51) Int. Cl.
  *H04W 56/00* (2009.01)
  *H04W 24/08* (2009.01)
  *H04W 76/04* (2009.01)

(52) U.S. Cl.
  CPC ............ *H04W 56/00* (2013.01); *H04W 24/08* (2013.01); *H04W 76/048* (2013.01)

(58) Field of Classification Search
  CPC .................................................. H04W 76/048

USPC ........... 455/67.11, 423, 450, 452.2, 502, 509
See application file for complete search history.

(56) References Cited

U.S. PATENT DOCUMENTS

| | | | |
|---|---|---|---|
| 8,320,323 B2 | 11/2012 | Dang et al. | |
| 8,711,709 B2 * | 4/2014 | Marinier et al. | 370/242 |
| 2005/0281222 A1 | 12/2005 | Ranta-Aho et al. | |
| 2009/0131094 A1 | 5/2009 | Natsume | |
| 2010/0014429 A1 | 1/2010 | Kim et al. | |

(Continued)

FOREIGN PATENT DOCUMENTS

| | | |
|---|---|---|
| CN | 101199143 A | 6/2008 |
| CN | 101296212 A | 10/2008 |
| CN | 101483446 A | 7/2009 |

(Continued)

OTHER PUBLICATIONS

International Search Report dated May 2, 2012 in connection with International Patent Application No. PCT/KR2011/008050.

(Continued)

*Primary Examiner* — Tuan H Nguyen (57) ABSTRACT

A subscriber station is configured to perform a channel measurement on a communication channel in restricted sub-frames for DRX and NON-DRX modes. The subscriber station includes a receiver configured to receive signals from a base station. The subscriber station also includes processing circuitry. When the receiver receives higher layer signaling indicating that channel quality measurement is to be performed in restricted sub-frames for measurement (RFSM), the processing circuitry is configured to extend an evaluation period for monitoring a quality of the communication channel.

12 Claims, 5 Drawing Sheets

(56) References Cited

U.S. PATENT DOCUMENTS

| | | |
|---|---|---|
| 2010/0188969 A1 | 7/2010 | Kim et al. |
| 2011/0039499 A1* | 2/2011 | Zhang et al. .............. 455/67.11 |
| 2011/0051611 A1 | 3/2011 | Chung et al. |
| 2011/0194528 A1 | 8/2011 | Dang et al. |
| 2012/0002593 A1 | 1/2012 | Kim et al. |
| 2012/0115469 A1 | 5/2012 | Chen et al. |

FOREIGN PATENT DOCUMENTS

| | | |
|---|---|---|
| CN | 101547465 A | 9/2009 |
| KR | 10-2008-0066561 | 7/2008 |
| KR | 10-2010-0088085 | 8/2010 |
| WO | WO 2012/062196 W1 | 5/2012 |

OTHER PUBLICATIONS

3GPP TSG-RAN WG4 Meeting #AH-04 "Impact of Enhanced ICIC for Non-Ca based Deployment on RAN4 Requirements"; R4-103738; Xi'an China, Oct. 11-15, 2010; 5 pages.

3GPP TSG-RAN WG4 Meeting #62bis "Specification of Resource-Specific Measurements"; R1-105257; Xi'an China, Oct. 11-15, 2010; 4 pages.

3GPP TSG-RAN WG1 Meeting #57 "Discussion on RLM for Time-Domain eICIC"; R4-104161; Jacksonville, USA, Nov. 15-19, 2010; 6 pages.

Chinese First Office Action dated Nov. 4, 2015 in connection with Chinese Patent Application No. 201180052467.5; 8 pages.

Japanese Office Action dated Nov. 30, 2015 in connection with Japanese Patent Application No. 2013-536516; 6 pages.

Japanese Office Action issued for JP 2013-536516 dated Aug. 1, 2016, 5 pgs.

Qualcomm Europe, "Impact of Blank Subframes on Inter-Frequency Measurements With DRX", 3GPP TSG-RAN WG4 #49, dated Nov. 10-14, 2008, 7 pgs.

* cited by examiner

APPARATUS AND METHOD FOR CHANNEL MEASUREMENT IN RADIO LINK MONITORING IN A WIRELESS NETWORK

CROSS-REFERENCE TO RELATED APPLICATION(S) AND CLAIM OF PRIORITY

This application is a continuation of, and incorporates by reference, U.S. Non-Provisional patent application Ser. No. 13/271,641 filed Oct. 12, 2011 and entitled "APPARATUS AND METHOD FOR CHANNEL MEASUREMENT IN RADIO LINK MONITORING IN A WIRELESS NETWORK," which claims priority to, and incorporates by reference, U.S. Provisional Patent Application No. 61/408,457 filed Oct. 29, 2010 and entitled "CHANNEL MEASUREMENT IN RADIO LINK MONITORING," and claims priority to, and incorporates by reference, U.S. Provisional Patent Application No. 61/477,068 filed Apr. 19, 2011 and entitled "CHANNEL MEASUREMENT IN RADIO LINK MONITORING."

TECHNICAL FIELD OF THE INVENTION

The present application relates generally to wireless communications systems and, more specifically, to a system and method for channel measurement in radio link monitoring.

BACKGROUND OF THE INVENTION

The downlink radio link quality of the serving cell can be monitored by subscriber station in order to indicate out-of-sync/in-sync status to higher layers. The subscribe station monitors the downlink link quality based on the cell-specific reference signal in order to detect the downlink radio link quality of the serving cell. The subscriber station estimates the downlink radio link quality and compares it to the thresholds Qout and Qin for the purpose of monitoring downlink radio link quality of the serving cell.

The threshold $Q_{out}$ is the level at which the downlink radio link cannot be reliably received and shall correspond to [10%] block error rate of a hypothetical PDCCH transmission taking into account the PCFICH errors with transmission. The threshold $Q_{in}$ is the level at which the downlink radio link quality can be significantly more reliably received than at $Q_{out}$ and shall correspond to [2%] block error rate of a hypothetical PDCCH transmission taking into account the PCFICH errors with transmission parameters.

SUMMARY OF THE INVENTION

A subscriber station configured to perform a channel measurement on a communication channel is provided. The subscriber station includes a receiver configured to receive signals from a base station. The subscriber station also includes processing circuitry. When the receiver receives higher layer signaling indicating that channel quality measurement is to be performed in restricted sub-frames for measurement (RFSM), the processing circuitry is configured to extend an evaluation period for monitoring a quality of the communication channel.

A wireless communication network is provided. The wireless communication network includes a subscriber station configured to perform a channel measurement on a communication channel. The subscriber station includes a receiver configured to receive signals from a base station. The subscriber station also includes processing circuitry. When the receiver receives higher layer signaling indicating that channel quality measurement is to be performed in restricted sub-frames for measurement (RFSM), the processing circuitry is configured to extend an evaluation period for monitoring a quality of the communication channel.

A method for performing a channel measurement on a communication channel is provided. The method includes receiving a plurality of signals from a base station. The method also includes, after receiving higher layer signaling indicating that channel quality measurement is to be performed in restricted sub-frames for measurement (RFSM), extending an evaluation period for monitoring a quality of the communication channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is noted that the 3GPP Long Term Evolution (LTE) term "node B" and "eNodeB" are additional terms for "base station" used below. Also, the LTE term "user equipment" or "UE" is another term for "subscriber station" (SS) or "mobile station" (MS) used below. Further, the term "femto" is another term for "femto base station" (RS) used below and "pico" is another term for "picocell" used below. The term "relay node" is another term for "relay station" (RS) used below.

Figure 1:
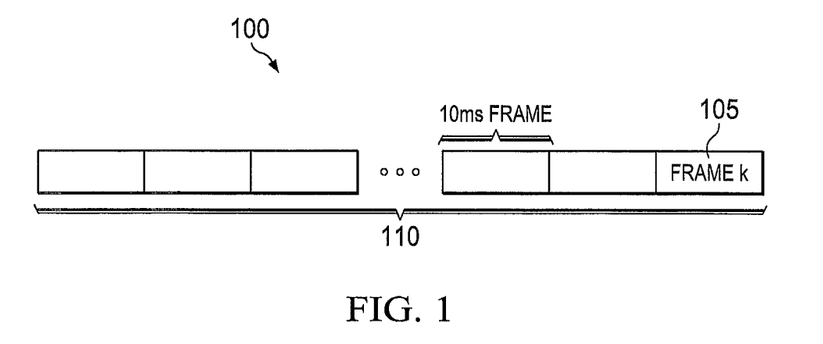
FIG. 1 illustrates a channel link quality evaluation in every ratio frame in non-DRX mode according to the disclosure.

FIG. 1 illustrates a channel link quality evaluation in every radio frame in non-discontinuous reception (DRX) mode according to the disclosure. The channel link quality evaluation 100 shown in FIG. 1 is for illustration only. Other examples of the channel link quality evaluation can be used without departing from the scope of this disclosure.

In non-DRX mode operation, a physical layer in the subscriber station assesses the radio link quality in every radio frame. The subscriber station evaluates the radio link quality over a previous defined time period against thresholds $Q_{out}$ and $Q_{in}$ for the purpose of monitoring downlink radio link quality of the serving cell. The threshold $Q_{out}$ is defined as the level at which the downlink radio link cannot be reliably received and shall correspond to [10%] block error rate of a hypothetical PDCCH transmission taking into account the PCFICH errors with transmission parameters specified in Table 7.6.1-1 of 3GPP TS36.133, "Evolved Universal Terrestrial Radio Access (E-UTRA); Requirements for support of radio resource management, the contents of which are incorporated by reference. The threshold $Q_{in}$ is defined as the level at which the downlink radio link quality can be significantly more reliably received than at $Q_{out}$ and shall correspond to [2%] block error rate of a hypothetical PDCCH transmission taking into account the PCFICH errors with transmission parameters specified in Table 7.6.1-2 of 3GPP TS36.133, "Evolved Universal Terrestrial Radio Access (E-UTRA); Requirements for support of radio resource management, the contents of which are incorporated by reference. In radio frames in which the radio link quality is assessed, the physical layer in the subscriber station indicates out-of-sync to higher layers when the radio link quality is worse than the threshold $Q_{out}$. When the radio link quality is better than the threshold $Q_{in}$, the physical layer in the subscriber station, in the radio frames in which the radio link quality is assessed, indicates in-sync to higher layers.

In each radio frame, when the downlink radio link quality estimated over the last two-hundred milliseconds (ms) period becomes worse than the threshold $Q_{out}$, Layer 1 of the subscriber station sends an out-of-sync indication to the higher layers within two-hundred ms $Q_{out}$ evaluation period. A Layer 3 filter is applied to the out-of-sync indications as outlined in 3GPP TS 36.331: "Evolved Universal Terrestrial Radio Access (E-UTRA); Radio Resource Control (RRC) protocol specification", the contents of which are incorporated by reference.

In each radio frame, when the downlink radio link quality estimated over the last one-hundred ms period becomes better than the threshold $Q_{in}$, Layer 1 of the subscriber station sends an in-sync indication to the higher layers within one-hundred ms $Q_{in}$ evaluation period. A L3 filter shall be applied to the in-sync indications as outlined in Evolved Universal Terrestrial Radio Access (E-UTRA); Radio Resource Control (RRC) protocol specification.

The out-of-sync and in-sync evaluations can be performed as specified in section 4.2.1 in 3GPP TS 36.213: "Evolved Universal Terrestrial Radio Access (E-UTRA); Physical layer procedures," the contents of which are incorporated by reference. Two successive indications from Layer 1 shall be separated by at least ten ms. The transmitter power can be turned off within forty ms after an expiration of a timer (T310 timer) as specified in section 5.3.11 in Evolved Universal Terrestrial Radio Access (E-UTRA); Radio Resource Control (RRC) protocol specification.

For example, in Frame 105, the subscriber station estimates the downlink link quality based on the cell-specific reference signal of all or some sub-frames in the evaluation period 110. If the link quality evaluated over the previous twenty frames is lower than $Q_{out}$, an out-of-sync indication is sent to high-layers for further processing. If the link quality evaluated over the past ten frames is higher than $Q_{in}$, an in-sync indication is sent to high-layers for further processing.

Figure 2:
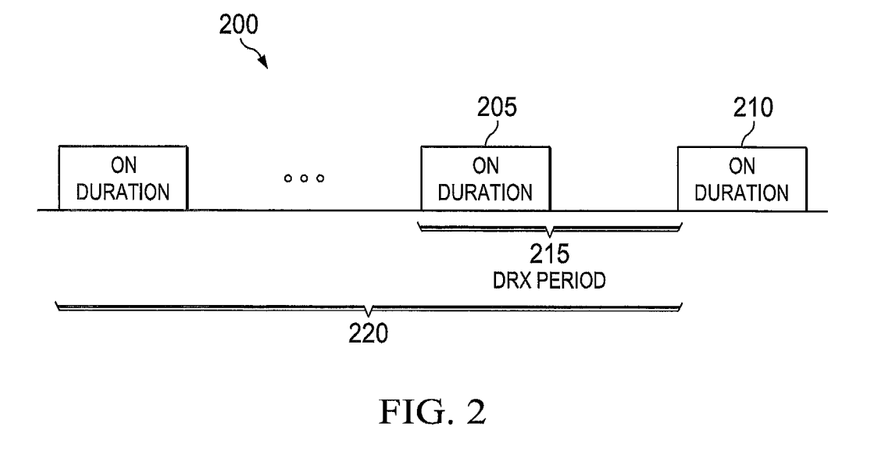
FIG. 2 illustrates an evaluation period in DRX mode according to this disclosure.

FIG. 2 illustrates an evaluation period in DRX mode according to this disclosure. The evaluation period 200 shown in FIG. 2 is for illustration only. Other examples could be used without departing from the scope of this disclosure.

In DRX mode operation, the physical layer in the subscriber station, at least once every DRX period, assess the radio link quality, which is evaluated over the previous time period against thresholds $Q_{out}$ and $Q_{in}$. The physical layer in the subscriber station, in radio frames in which the radio link quality is assessed, indicates out-of-sync to higher layers when the radio link quality is worse than the threshold $Q_{out}$. When the radio link quality is better than the threshold $Q_{in}$, the physical layer in the subscriber station, in radio frames where the radio link quality is assessed, indicates in-sync to higher layers.

When DRX is used, the $Q_{out}$ evaluation period ($T_{Evaluate\_Q_{out\_DRX}}$) and the $Q_{in}$ evaluation period ($T_{Evaluate\_Q_{in\_DRX}}$) is specified in Table 1.

TABLE 1

$Q_{out}$ and $Q_{in}$ Evaluation Period in DRX

| DRX cycle length (s) | $T_{Evaluate\_Q_{out\_DRX}}$ and $T_{Evaluate\_Q_{in\_DRX}}$ (s) (DRX cycles) |
|---|---|
| ≤0.04 | [Note (20)] |
| 0.08 | [0.8 (10)] |
| 0.16 | [1.6 (10)] |
| 0.32 | [3.2 (10)] |
| 0.64 | [6.4 (10)] |
| 1.28 | [6.4 (5)] |
| 2.56 | [12.8 (5)] |

Note:
Evaluation period length in time depends on the length of the DRX cycle in use The DRX cycle length of time from when the subscriber station commences a first On duration 205 to a second On duration 210. The DRX cycle is also referenced as the DRX period 215.

When the downlink radio link quality estimated over the last $T_{Evaluate\_Q_{out\_DRX}}$ [s] period becomes worse than the threshold $Q_{out}$, Layer 1 of the subscriber station sends out-of-sync indication to the higher layers within $T_{Evaluate\_Q_{out\_DRX}}$ [s] evaluation period. A Layer 3 filter can be applied to the out-of-sync indications.

When the downlink radio link quality estimated over the last $T_{Evaluate\_Q_{in}\_DRX}$ [s] period becomes better than the threshold $Q_{in}$, Layer 1 of the subscriber station sends in-sync indications to the higher layers within $T_{Evaluate\_Q_{in}\_DRX}$ [s] evaluation period. An L3 filter can be applied to the in-sync indications.

Two successive indications from Layer 1 can be separated by at least max (10 ms, DRX_cycle_length). Upon start of the T310 timer, the subscriber station monitors the link for recovery using the evaluation period and Layer 1 indication interval corresponding to the non-DRX mode until the expiration of the T310 timer. The transmitter power can be turned off within forty ms after expiration of the T310 counter.

For example, in each DRX period 215, the subscriber station estimates the downlink link quality based on the cell-specific reference signal of all or some on-duration sub-frames in the evaluation period 220, depending on user equipment (UE) implementation. If the link quality evaluated over the evaluation period is lower than $Q_{out}$, an out-of-sync indication is sent to high-layers for further processing. If the link quality evaluated over evaluation period is higher than $Q_{in}$, an in-sync indication is sent to high-layers for further processing.

To meet the performance requirements set forth for LTE-A, one theme is the incorporation in the system of new nodes with lower transmit power as compared to the usual macro eNBs. These new nodes (pico cells, home eNBs or femto cells, relays) change the topology of the system to a much more heterogeneous network with a completely new interference environment in which nodes of multiple classes "compete" for the same wireless resources.

In heterogeneous networks, the interference problem may become serious due to the introduction of low power nodes, which leads to low geometries especially in the co-channel deployment scenarios. The low geometries seen in heterogeneous deployments necessitate the use of interference coordination for both control and data channels to enable robust operation. In the 3GPP RAN1 meetings, many interference coordination solutions such as resource partition and power control have been proposed. The motivation of time domain interference coordination is to avoid transmission collision in the same time resource from different layer. In some sub-frames, the interfering node can limit its transmission to avoid causing excessive interference, while the interfered node can schedule subscriber stations that suffer severe interference from interfering node in these sub-frames.

Figure 3:
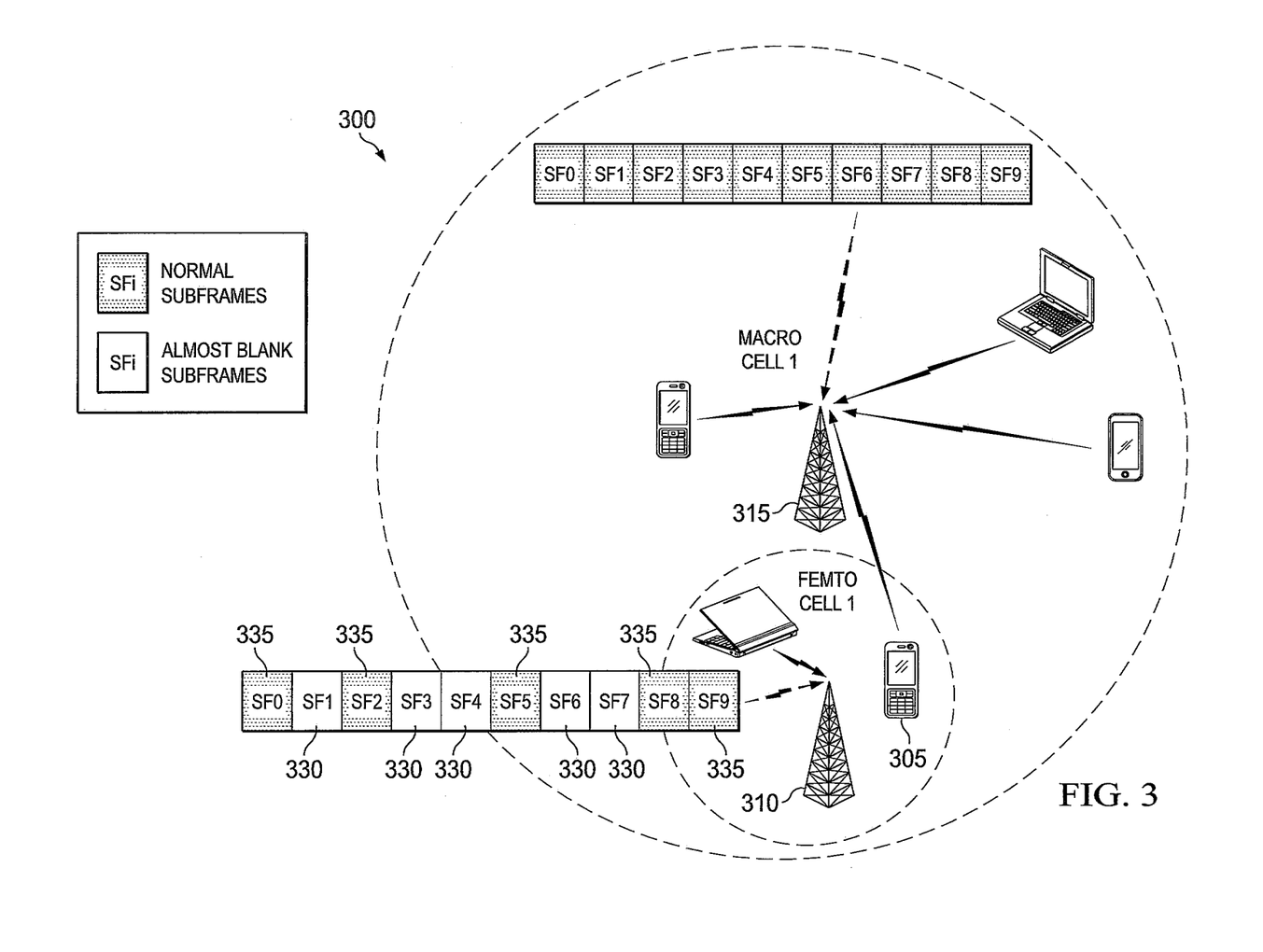
FIG. 3 illustrates a wireless communication system with a dominant interference condition in a Macro-Femto deployment according to this disclosure.

FIG. 3 illustrates a wireless communication system with a dominant interference condition in a Macro-Femto deployment according to this disclosure. The dominant interference condition shown in FIG. 3 is for illustration only. Other embodiments could be used without departing from the scope of this disclosure.

In macro-femto deployment of the wireless communication system 300, a non-CSG macro subscriber station (MUSS) 305 is exposed to dominant interference condition when it is in close proximity of a CSG femto home eNBs (HeNB) 310. Here, the MUSS 305 fails to decode control or data channels from the Macro eNB (MeNB) 315 unless the interference from the HeNB 310 is avoided or mitigated by an eICIC solution. Time-domain eICIC refers to a solution where control, data channels, or a combination thereof, for the MUSS 305 is transmitted in some time-domain resources, such as a sub-frame or OFDM symbol, at which interference from the HeNB 310 is avoided or mitigated.

Figure 4:
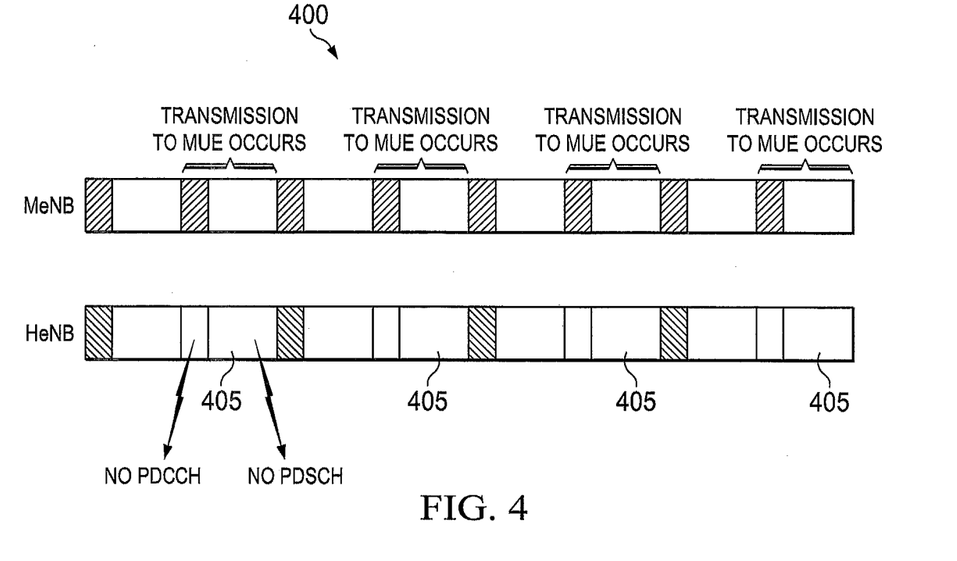
FIG. 4 illustrates an eICIC solution based on almost blank sub-frames with sub-frame alignments according to this disclosure.

FIG. 4 illustrates an eICIC solution based on almost blank sub-frames with sub-frame alignments according to this disclosure. The embodiment of the eICIC solution 400 shown in FIG. 4 is for illustration only. Other embodiments of the eICIC solution 400 could be used without departing from the scope of this disclosure.

In one example, HeNB 310 does not transmit PDCCH in some sub-frames that are configured as almost blank sub-frame (ABSF) 405. There is no PDSCH transmission in the ABSF 405 as a consequence of almost blanking. The HeNB 310 only transmits CRS (and some essential signals such as primary broadcast channel (PBCH), primary synchronization signal (PSS) and secondary synchronization signal (SSS) in the ABSF 405 in order to alleviate dominant interference to the channels of the MUSS 305. Detailed features of almost blank sub-frames are explained further in "R1-104256, eICIC solutions details, Qualcomm," the contents of which are incorporated by reference. The eICIC between MeNB 315 and HeNB 310 is performed in a sub-frame-wise fashion. In another example, HeNB 310 configures the entire sub-frame 405 as almost blank sub-frame instead of muting some OFDM symbols. Therefore, the MUSS 305 can receive interference-free control channels but, as a result, at least two consecutive sub-frames should be configured as almost blank sub-frame in order to protect the control and data channel of the MUSS 305. That is, there exists some restriction in the ABSF configuration. This operation is beneficial in that the impact of PDSCH symbol muting does not need to be considered. The restriction in the ABSF configuration may lead to relative resource loss when compared to the PDSCH symbol muting approach. However, this loss can be alleviated by configuring the ABSF 405 as continuously as possible as illustrated in FIG. 5.

Figure 5:
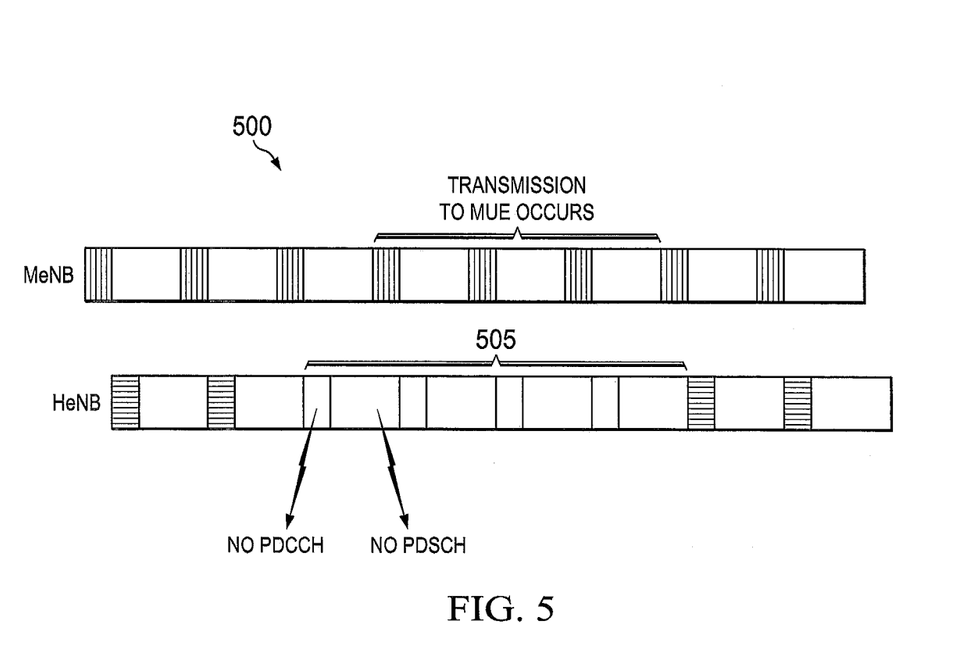
FIG. 5 illustrates an eICIC based on consecutive sub-frame blanking with OFDM symbol shift according to this disclosure.

FIG. 5 illustrates an eICIC based on consecutive sub-frame blanking with OFDM symbol shift according to this disclosure. The embodiment of the a eICIC 500 shown in FIG. 5 is for illustration only. Other embodiments of the eICIC 500 could be used without departing from the scope of this disclosure.

N−1 sub-frames can be used to serve the MUSS 305 in close proximity of HeNB 310 by blanking N consecutive HeNB sub-frames 505. The continuous configuration of an almost blank sub-frame (that is, the N consecutive HeNB sub-frames 505) is also beneficial in mitigating the impact of PDSCH symbol muting discussed above.

Figure 6:
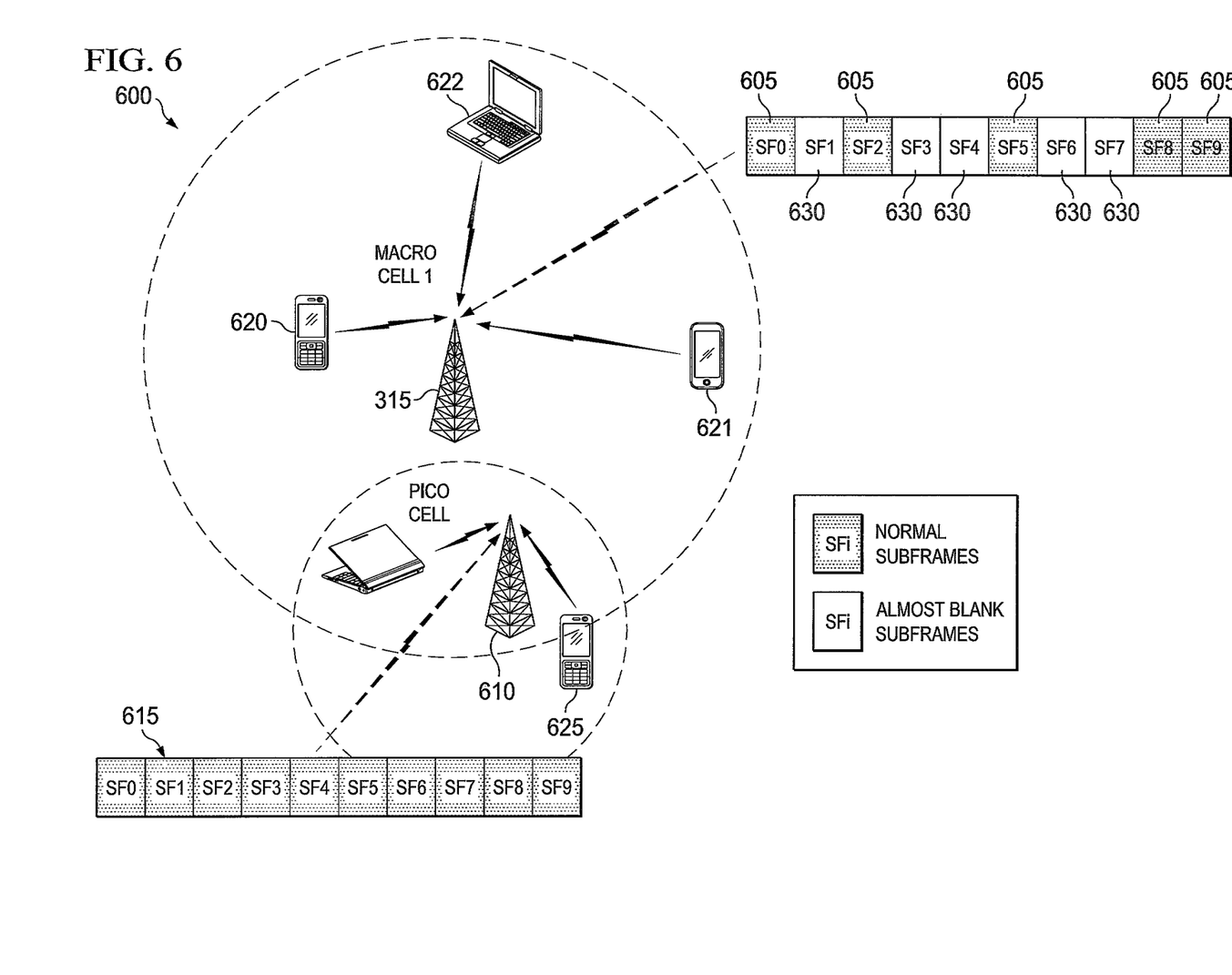
FIG. 6 illustrates a wireless communication system with a dominant interference condition in a Macro-Pico deployment according to this disclosure.

FIG. 6 illustrates a wireless communication system with a dominant interference condition in a Macro-Pico deployment 600 according to this disclosure. The dominant interference condition shown in FIG. 6 is for illustration only. Other embodiments could be used without departing from the scope of this disclosure.

When the MeNB 315 brings high interference to one or more Pico Users, sub-frame blanking can be applied to eliminate inter-cell interference. In one illustrative example, the MeNB 315 sends data in sub-frames SF0, SF2, SF5, SF8, and SF9 605 while the Pico cell 610 can use all sub-frames 615 for cell-center users and sub-frames SF1, SF3, SF4, SF6, and SF7 for cell-edge users.

In both Macro-Femto 300 and Macro-Pico 600 examples, some subscriber stations will be configured by its serving cells to perform measurements for radio link monitoring (RLM) on restricted sub-frame(s), which ensures preventing unnecessary RLF and accurate measurement results of RSRP/RSRQ, and the like. For example, in Macro-Femto 300 example shown in FIG. 3, Femto subscriber stations will be restricted to communicate on sub-frames SF0, SF2, SF5, SF8, and SF9 and a MUSS 305, which is close to the Femto cell 310, can be scheduled on sub-frames SF1, SF3, SF4, SF6, and SF7 for data transmission. In the Macro-Pico 600 example shown in FIG. 6, Macro subscriber stations (SS) 620, 621, 622 will be restricted to communicate on sub-frames SF0, SF2, SF5, SF8, and SF9 while a Pico cell-edge SS 625 will be scheduled only on sub-frames SF1, SF3, SF4, SF6 and SF7.

In these cases, when the SS needs to restrict its measurement on some sub-frames for monitoring link quality, the number of available sub-frames for channel link quality estimation is smaller than that in Rel-8 systems where all sub-frames can be used for estimation purpose. Especially, in some cases when the SS is restricted to do measurement on only one sub-frame in each radio frame while previously, all ten sub-frames can be used for measurement, the channel link quality monitoring will no longer be reliable based on the same duration of the evaluation period.

When higher-layer signaling indicates certain sub-frames for restricted radio link monitoring, the radio link quality is not monitored in any sub-frame other than those indicated. The sub-frames that the SS is restricted to perform channel quality measurement can be referenced as restricted sub-frames for measurement (RSFM). In one example, RSFM are almost blank sub-frames, that is. Sub-frames SF1, SF3, SF4, SF6, SF7 630 for Pico cell-edge SS 625 in FIG. 6. In one example, RSFM are sub-frames SF0, SF2, SF5, SF8, SF9 605 for MUSS 620, 621, 622. In one example, RSFM are almost blank sub-frames, such as SF1, SF3, SF4, SF6, SF7 330 for a MUSS 305 that is close to the Femto cell 310 in FIG. 3. In another example, RSFM are sub-frames SF0, SF2, SF5, SF8, and SF9 335 for Femto subscriber stations.

In some embodiments of the present disclosure, the evaluation period of radio link monitoring is improved to assure the same performance as in Rel-8. In some embodiments, the evaluation period is extended for radio link monitoring in both DRX and non-DRX modes.

In the Non-DRX case, MUSS 305 evaluates, in each radio frame assessed, the link quality over the evaluation period. With restricted measurement, only the RSFM within each frame of the evaluation period can be used for link quality measurement. Further, the specific RSFM used depends on subscriber station implementation and performance requirements.

In some embodiments, the MUSS 305 is configured to perform an extended evaluation period (EEP). The MUSS 305 can perform the extended evaluation period for Qin evaluation $EEP_I$ and the extended evaluation period for Qout evaluation $EEP_O$. Herein, the number of RSFM in one radio frame is denoted as $N_{RSFM}$.

In some embodiments, both $EEP_I$ and $EEP_O$ are functions of NRSFM. For example, Equations 1-2:

$$Q_{out}:EEP_O=f(200,N_{RSFM}); \text{ or}$$

$$EEP_O=f(N_{RSFM}) \quad \text{[Eqn. 1]}$$

$$Q_{in}:EEP_I=f(100,N_{RSFM}); \text{ or}$$

$$EEP_I=f(N_{RSFM}) \quad \text{[Eqn. 2]}$$

In some embodiments, $EEP_I$ and $EEP_O$ are defined by Equations 3 and 4:

$$EEP_O = \left\lceil \frac{200}{N_{RSFM}} \right\rceil *10(ms); \quad \text{[Eqn. 3]}$$

$$EEP_I = \left\lceil \frac{100}{N_{RSFM}} \right\rceil *10(ms) \quad \text{[Eqn. 4]}$$

In some embodiments, $EEP_I$ and $EEP_O$ are defined by Equations 5 and 6:

$$EEP_O = \left\lfloor \frac{200}{N_{RSFM}} \right\rfloor *10(ms); \quad \text{[Eqn. 5]}$$

$$EEP_I = \left\lfloor \frac{100}{N_{RSFM}} \right\rfloor *10(ms) \quad \text{[Eqn. 6]}$$

In some embodiments, $EEP_I$ and $EEP_O$ can include an adjusting coefficient. For example, $EEP_I$ and $EEP_O$ can be defined by Equations 7 and 8:

$$EEP_O = \left\lceil \frac{200 \cdot \beta}{N_{RSFM}} \right\rceil *10(ms), \text{ where } 0 < \beta \leq 1;. \quad \text{[Eqn. 7]}$$

$$EEP_I = \left\lceil \frac{100 \cdot \beta}{N_{RSFM}} \right\rceil *10(ms), \text{ where } 0 < \beta \leq 1 \quad \text{[Eqn. 8]}$$

In some embodiments, $EEP_I$ and $EEP_O$ are defined by Equations 9 and 10:

$$EEP_O = \left\lfloor \frac{200 \cdot \beta}{N_{RSFM}} \right\rfloor *10(ms), \text{ where } 0 < \beta \leq 1; \quad \text{[Eqn. 9]}$$

$$EEP_I = \left\lfloor \frac{100 \cdot \beta}{N_{RSFM}} \right\rfloor *10(ms), \text{ where } 0 < \beta \leq 1 \quad \text{[Eqn. 10]}$$

In some embodiments, $EEP_I$ and $EEP_O$ are based upon a Table based mapping function. For example, $EEP_I$ and $EEP_O$ can be based on Table 2:

TABLE 2

| Table based mapping functions | | |
|---|---|---|
| $N_{RSFM}$ | $EEP_O$ (ms) | $EEP_I$ (ms) |
| 1-2 | 500 ms | 300 ms |
| 3-4 | 400 ms | 200 ms |
| 5-6 | 300 ms | 180 ms |
| 7-8 | 250 ms | 140 ms |
| 9-10 | 200 ms | 100 ms |

In some embodiments, $EEP_I$ is a function of the evaluation period of $Q_{in}$, denoted by $EP_I$, of subscriber stations that are not restricted for measurement and $EEP_O$ is a function of the evaluation period of $Q_{out}$, denoted by $EP_O$, of subscriber stations that are not restricted for measurement. That is:

$$Q_{out}:EEP_O=f(EP_O) \quad \text{[Eqn. 11]}$$

$$Q_{in}:EEP_I=f(EP_I) \quad \text{[Eqn. 12]}$$

In some embodiments, $EEP_I$ and $EEP_O$ can be based on Equations 13 and 14:

$$Q_{out}:EEP_O=ko*EP_O; \quad \text{[Eqn. 13]}$$

$$Q_{in}:EEP_I=ki*EP_I, \quad \text{[Eqn. 14]}$$

In Equations 13 and 14, ki and ko can be either different or the same. In one example, ko=ki=2 or ko=3 and ki=2.

In the DRX case, MUSS 305 can, at least once every DRX period, assess the radio link quality. Additionally, the evaluation period is several consecutive DRX periods as discussed herein above. Within restricted measurement, only the RSFM within each frame of the evaluation period can be used for link quality measurement. In addition, the specific RSFM that are used depends on UE implementation and performance requirements.

In some embodiments, the extended $Q_{out}$ evaluation period (TEvaluate_$Q_{out}$_DRX2) can be a function of TEvaluate_$Q_{out}$_DRX and an RSFM ratio ($\alpha$). The RFSM ratio ($\alpha$) can be defined by Equation 15:

$$\alpha = \frac{\text{\# of } RFSM \text{ in one On-Duration}}{\text{\# of Subframes in one On-Duration}} \qquad [\text{Eqn. 15}]$$

The extended $Q_{in}$ evaluation period (TEvaluate_$Q_{in}$_DRX2) can be a function of TEvaluate_$Q_{in}$_DRX and $\alpha$. For example, the extended evaluation period for $Q_{out}$ is:

$Q_{out}$:TEvaluate_$Q_{out}$_DRX2=$f$(TEvaluate_$Q_{out}$_DRX,$\alpha$); and the extended evaluation period for $Q_{in}$ is:

$Q_{in}$:TEvaluate_$Q_{in}$_DRX2=$f$(TEvaluate_$Q_{in}$_DRX,$\alpha$).

Here the unit of cycle is used in all definitions of evaluation period.

In some embodiments:

$$\text{TEvaluate\_Qout\_DRX2} = \left\lceil \frac{\text{TEvaluate\_Qout\_DRX}}{\alpha} \right\rceil \qquad [\text{Eqn 16}]$$

$$\text{TEvaluate\_Qin\_DRX2} = \left\lceil \frac{\text{TEvaluate\_Qin\_DRX}}{\alpha} \right\rceil \qquad [\text{Eqn 17}]$$

In some embodiments:

$$\text{TEvaluate\_Qout\_DRX2} = \left\lfloor \frac{\text{TEvaluate\_Qout\_DRX}}{\alpha} \right\rfloor \qquad [\text{Eqn. 18}]$$

$$\text{TEvaluate\_Qin\_DRX2} = \left\lfloor \frac{\text{TEvaluate\_Qin\_DRX}}{\alpha} \right\rfloor \qquad [\text{Eqn. 19}]$$

In some embodiments TEvaluate_Qout_DRX2 and TEvaluate_Qin_DRX2 are defined by Equations 20 and 21, where 0<$\beta$≤1, is an adjusting coefficient:

$$\text{TEvaluate\_Qout\_DRX2} = \left\lceil \frac{\text{TEvaluate\_Qout\_DRX} \cdot \beta}{\alpha} \right\rceil \qquad [\text{Eqn 20}]$$

$$\text{TEvaluate\_Qin\_DRX2} = \left\lceil \frac{\text{TEvaluate\_Qin\_DRX} \cdot \beta}{\alpha} \right\rceil \qquad [\text{Eqn 21}]$$

In some embodiments TEvaluate_Qout_DRX2 and TEvaluate_Qin_DRX2 are defined by Equations 22 and 23, where 0<$\beta$≤1, is an adjusting coefficient:

$$\text{TEvaluate\_Qout\_DRX2} = \left\lfloor \frac{\text{TEvaluate\_Qout\_DRX} \cdot \beta}{\alpha} \right\rfloor \qquad [\text{Eqn. 22}]$$

$$\text{TEvaluate\_Qin\_DRX2} = \left\lfloor \frac{\text{TEvaluate\_Qin\_DRX} \cdot \beta}{\alpha} \right\rfloor \qquad [\text{Eqn. 23}]$$

In some embodiments, a table based mapping function can be used to define the evaluation period.

For example, the evaluation period defined in Table 3 can be used. In this example, the same extension ratio is used for all DRX cycle lengths.

TABLE 3

$Q_{out}$ and $Q_{in}$ Evaluation Period in DRX

| DRX cycle length (s) | $T_{Evaluate\_Q_{out}\_DRX}$ and $T_{Evaluate\_Q_{in}\_DRX}$ (s) (DRX cycles) |
|---|---|
| ≤0.04 | [Note (20$\gamma$)] |
| 0.08 | [0.8$\gamma$ (10$\gamma$)] |
| 0.16 | [1.6$\gamma$ (10$\gamma$)] |
| 0.32 | [3.2$\gamma$ (10$\gamma$)] |
| 0.64 | [6.4$\gamma$ (10$\gamma$)] |
| 1.28 | [6.4$\gamma$ (5$\gamma$)] |
| 2.56 | [12.8$\gamma$ (5$\gamma$)] |

Note:
Evaluation period length in time depends on the length of the DRX cycle in use Equivalently, Table 3 can be rewritten in the format of Table 4, as shown below:

TABLE 4

$Q_{out}$ and $Q_{in}$ Evaluation Period in DRX

| DRX cycle length (s) | $T_{Evaluate\_Q_{out}\_DRX}$ and $T_{Evaluate\_Q_{in}\_DRX}$ (s) (DRX cycles) |
|---|---|
| ≤0.04 | Note (20 $\gamma$) |
| 0.04 < DRX cycle ≤ 0.64 | Note (10 $\gamma$) |
| 0.64 < DRX cycle ≤ 2.56 | Note (5 $\gamma$) |

Note:
Evaluation period length in time depends on the length of the DRX cycle in use The extension ratio $\gamma$ for Tables 3 and 4 can be one value, such as "2", or given in a table for better granularity. In one example, $\gamma$ is given in Table 5. With this definition, different extension periods are defined for all DRX cycle lengths based on the ABSF ratio. Note that when $\alpha$ is 1, all sub-frames can be used for measurement, which is equivalent to the case that no restriction is applied. In another example, $\gamma$ is given in Table 6. In this example, if higher-layer signaling indicates certain sub-frames for restricted radio link monitoring, the evaluation period is extended to twice of the period when no restriction is applied.

The extension ratio $\gamma$ can also be signaled to MUSS 305 using high layer signaling.

TABLE 5

Extension Ratio According to RSFM Ratio

| $\alpha$ | $\gamma$ |
|---|---|
| 0~0.2 | 8 |
| 0.2~0.4 | 6 |
| 0.4~0.6 | 4 |
| 0.6~0.8 | 2 |
| 0.8~1.0 | 1 |

TABLE 6

Extension Ratio According to Whether Restricted
Measurement is Enforced or Not

| Higher-layer signaling indicates certain sub-frames for restricted radio link monitoring | γ |
|---|---|
| Yes | 2 |
| No | 1 |

In another example, the table based function can define different extension ratios for different DRX cycle lengths. An example is given in Table 7, in which the extension ratios $\gamma_1$, $\gamma_2$, and $\gamma_3$ can be of different or the same values.

TABLE 7

$Q_{out}$ and $Q_{in}$ Evaluation Period in DRX

| DRX cycle length (s) | $T_{Evaluate\_Q_{out}\_DRX}$ and $T_{Evaluate\_Q_{in}\_DRX}$ (s) (DRX cycles) |
|---|---|
| ≤0.04 | Note (20$\gamma_1$) |
| 0.04 < DRX cycle ≤ 0.64 | Note (10$\gamma_2$) |
| 0.64 < DRX cycle ≤ 2.56 | Note (5$\gamma_3$) |

Note:
Evaluation period length in time depends on the length of the DRX cycle in use The extension ratios can be predetermined explicitly. An example of the extension ratios are given in Table 8.

The extension ratios can also be functions of α. These functions can be expressions of α or table based mapping functions. An example of table based mapping function is given in Table 9.

In another example, the extension ratios can be signaled to the UE using high layer signaling.

TABLE 8

Extension Ratio According to Whether Restricted
Measurement is Enforced or Not

| | Higher-layer signaling indicates certain sub-frames for restricted radio link monitoring | |
|---|---|---|
| Extension ratios | Yes | No |
| $\gamma_1$ | 2 | 1 |
| $\gamma_2$ | 1.5 | 1 |
| $\gamma_3$ | 1 | 1 |

TABLE 9

Extension Ratio According to α.

| | α | | | |
|---|---|---|---|---|
| Extension ratios | 0~0.25 | 0.25~0.5 | 0.5~0.75 | 0.75~1 |
| $\gamma_1$ | 4 | 3 | 2 | 1 |
| $\gamma_2$ | 4 | 3 | 1 | 1 |
| $\gamma_3$ | 3 | 2 | 1 | 1 |

In some embodiments, the extended $Q_{out}$ evaluation period (TEvaluate_$Q_{out}$_DRX2) should be a function of TEvaluate_$Q_{out}$_DRX, and the extended $Q_{in}$ evaluation period (TEvaluate_$Q_{in}$_DRX2) should be a function of TEvaluate_$Q_{in}$_DRX, that is, the extended evaluation period for Qout is:

$$Q_{out}: TEvaluate\_Q_{out}\_DRX2 = f(TEvaluate\_Q_{out}\_DRX) \quad [Eqn. 24]$$

In addition, the extended evaluation period for $Q_{in}$ is:

$$Q_{in}: TEvaluate\_Q_{in}\_DRX2 = f(TEvaluate\_Q_{in}\_DRX) \quad [Eqn. 25]$$

Here the unit of cycle is used in all definitions of evaluation period.

In one example, the evaluation period is defined by Equations 26 and 27:

$$TEvaluate\_Q_{out}\_DRX2 = ko * TEvaluate\_Q_{out}\_DRX \quad [Eqn. 26]$$

$$TEvaluate\_Q_{in}\_DRX2 = ki * TEvaluate\_Q_{in}\_DRX \quad [Eqn. 27]$$

In Equations 26 and 27, ko and ki can be either different or the same. In one example, ko=ki=2 or ko=3 and ki=2, when higher-layer signaling indicates certain sub-frames for restricted radio link monitoring. Without higher-layer signaling indicating certain sub-frames for restricted radio link monitoring, ko=ki=1.

In additional and alternative embodiments, a table based mapping functions can be used to define the evaluation period. An example has been given in Tables 4 through 9 and the corresponding explanations.

Figure 7:
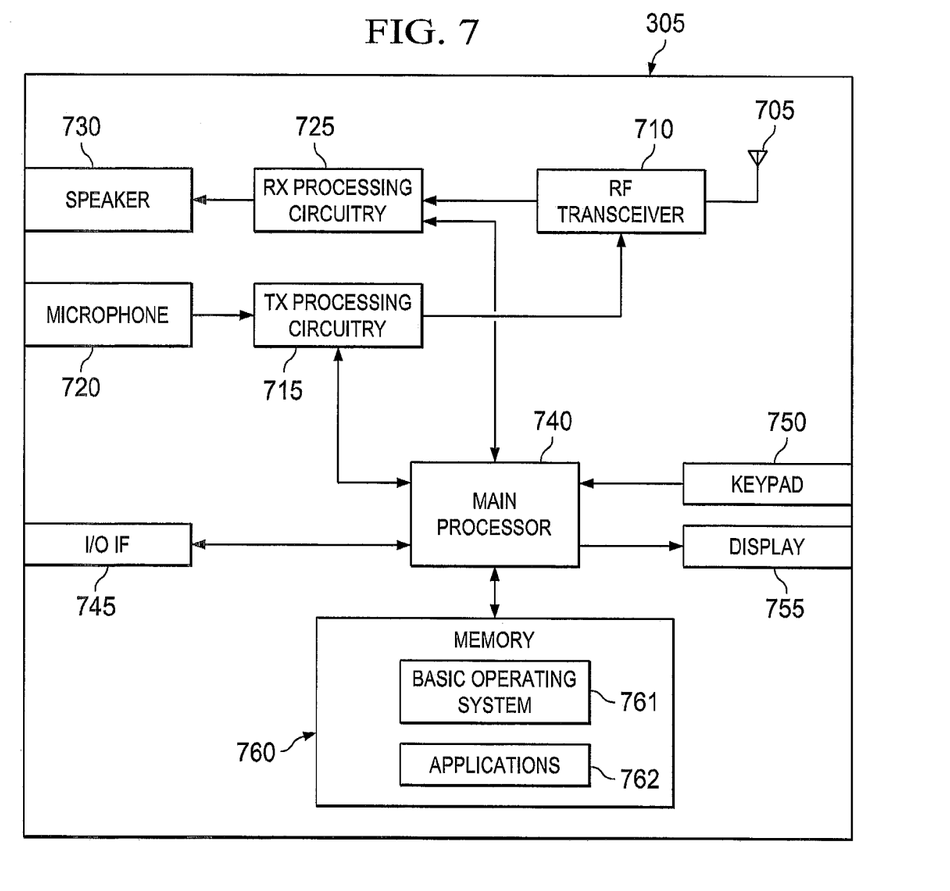
FIG. 7 illustrates an exemplary wireless subscriber station according to embodiments of the present disclosure.

FIG. 7 illustrates an exemplary wireless subscriber station according to embodiments of the present disclosure. The embodiment of wireless subscriber station 305 illustrated in FIG. 7 is for illustration only. Other embodiments of the wireless subscriber station could be used without departing from the scope of this disclosure.

Wireless subscriber station 305 can be an advance subscriber station (AMS). SS 305 comprises antenna 705, radio frequency (RF) transceiver 710, transmit (TX) processing circuitry 715, microphone 720, and receive (RX) processing circuitry 725. SS 305 also comprises speaker 730, main processor 740, input/output (I/O) interface (IF) 745, keypad 750, display 755, and memory 760. Memory 760 further comprises basic operating system (OS) program 761 and a plurality of applications 762.

Radio frequency (RF) transceiver 710 receives from antenna 705 an incoming RF signal transmitted by a base station 315 of wireless network 300. Radio frequency (RF) transceiver 710 down-converts the incoming RF signal to produce an intermediate frequency (IF) or a baseband signal. The IF or baseband signal is sent to receiver (RX) processing circuitry 725 that produces a processed baseband signal by filtering, decoding, and/or digitizing the baseband or IF signal. Receiver (RX) processing circuitry 725 transmits the processed baseband signal to speaker 730 (i.e., voice data) or to main processor 740 for further processing (e.g., web browsing).

Transmitter (TX) processing circuitry 715 receives analog or digital voice data from microphone 720 or other outgoing baseband data (e.g., web data, e-mail, interactive video game data) from main processor 740. Transmitter (TX) processing circuitry 715 encodes, multiplexes, and/or digitizes the outgoing baseband data to produce a processed baseband or IF signal. Radio frequency (RF) transceiver 710 receives the outgoing processed baseband or IF signal from transmitter (TX) processing circuitry 715. Radio frequency (RF) transceiver 710 up-converts the baseband or IF signal to a radio frequency (RF) signal that is transmitted via antenna 705.

In some embodiments, main processor 740 is a microprocessor or microcontroller. Memory 760 is coupled to main processor 740. According to some embodiments, part of memory 760 comprises a random access memory (RAM) and another part of memory 760 comprises a Flash memory, which acts as a read-only memory (ROM).

Main processor 740 executes basic operating system (OS) program 761 stored in memory 760 in order to control the overall operation of wireless subscriber station 305. In one such operation, main processor 740 controls the reception of forward channel signals and the transmission of reverse channel signals by radio frequency (RF) transceiver 710, receiver (RX) processing circuitry 725, and transmitter (TX) processing circuitry 715, in accordance with well-known principles.

Main processor 740 is capable of executing other processes and programs resident in memory 760, such as operations for channel measurement for radio link monitoring. Main processor 740 can move data into or out of memory 760, as required by an executing process. In some embodiments, the main processor 740 is configured to execute a plurality of applications 762, such as applications for channel measurement for radio link monitoring. For example, the main processor 740 is configured to execute a plurality of applications 762 to compute $Q_{out}$, $Q_{in}$, $EEP_O$, $EEP_I$, $EP_O$, $EP_I$, TEvaluate_$Q_{out}$_DRX2, TEvaluate_$Q_{in}$_DRX2 and so forth. The main processor 740 can operate the plurality of applications 762 based on OS program 761 or in response to a signal received from MeNB 305. Main processor 740 is also coupled to I/O interface 745. I/O interface 745 provides subscriber station 305 with the ability to connect to other devices such as laptop computers and handheld computers. I/O interface 745 is the communication path between these accessories and main controller 740.

Main processor 740 is also coupled to keypad 750 and display unit 755. The operator of subscriber station 305 uses keypad 750 to enter data into subscriber station 305. Display 755 may be a liquid crystal display capable of rendering text and/or at least limited graphics from web sites. Alternate embodiments may use other types of displays.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of evaluating synchronization between an evolved Node B (eNB) and a User Equipment (UE) in the UE, the method comprising:
    identifying a discontinuous reception (DRX) cycle;
    receiving a higher layer signaling indicating a resource for restricted radio link monitoring from the eNB;
    determining an evaluation period based on the DRX cycle and the higher layer signaling; and
    evaluating the synchronization based on the determined evaluation period.

2. The method of claim 1, wherein the evaluation period is an integer multiple of the DRX cycle.

3. The method of claim 1, wherein the evaluation period is determined based on a pre-determined relation between the evaluation period and the DRX cycle.

4. The method of claim 1, wherein a first evaluation period corresponding to a first DRX cycle is an integer multiple of a second evaluation period corresponding to a second DRX cycle.

5. A User Equipment (UE) configured to evaluate synchronization between an evolved Node B (eNB) and the UE, the UE comprising:
    a signal input configured to receive a higher layer signaling indicating a resource for restricted radio link monitoring from the eNB; and
    a processor configured to
        identify a discontinuous reception (DRX) cycle,
        determine an evaluation period based on the DRX cycle and the higher layer signaling, and
        evaluate the synchronization based on the determined evaluation period.

6. The UE of claim 5, wherein the evaluation period is an integer multiple of the DRX cycle.

7. The UE of claim 5, wherein the evaluation period is determined based on a pre-determined relation between the evaluation period and the DRX cycle.

8. The UE of claim 5, wherein a first evaluation period corresponding to a first DRX cycle is an integer multiple of a second evaluation period corresponding to a second DRX cycle.

9. An evolved Node B (eNB) configured to facilitate evaluation of synchronization between a User Equipment (UE) and eNB, the eNB comprising:
    a transceiver configured to transmit a resource for restricted radio link monitoring specified by higher layer signaling to the UE, wherein the UE is configured to determine an evaluation period based on an identified discontinuous reception (DRX) cycle and the resource for restricted radio link monitoring and to evaluate the synchronization based on the determined evaluation period; and
    a processor configured to control communication between the eNB and the UE during the evaluation period.

10. The eNB of claim 9, wherein the evaluation period is an integer multiple of the DRX cycle.

11. The eNB of claim 9, wherein the evaluation period is determined based on a pre-determined relation between the evaluation period and the DRX cycle.

12. The eNB of claim 9, wherein a first evaluation period corresponding to a first DRX cycle is an integer multiple of a second evaluation period corresponding to a second DRX cycle.

* * * * *

UNITED STATES PATENT AND TRADEMARK OFFICE
CERTIFICATE OF CORRECTION

| | | |
|---|---|---|
| PATENT NO. | : 9,451,568 B2 | |
| APPLICATION NO. | : 14/258829 | |
| DATED | : September 20, 2016 | |
| INVENTOR(S) | : Guowang Miao et al. | |

It is certified that error appears in the above-identified patent and that said Letters Patent is hereby corrected as shown below:

In the Specification

At col. 12, line 21, please replace "305" with --315--.

In the Claims

In claim 5 at col. 14, line 11, please insert --unit-- after "signal input".

Signed and Sealed this
Eighth Day of November, 2016

Michelle K. Lee
*Director of the United States Patent and Trademark Office*